US012704648B2

(12) United States Patent
Huang et al.

(10) Patent No.: US 12,704,648 B2
(45) Date of Patent: Aug. 11, 2026

(54) SATELLITE SIGNAL PROCESSING METHOD AND SATELLITE POSITIONING APPARATUS

(71) Applicant: HUAWEI TECHNOLOGIES CO., LTD., Shenzhen (CN)

(72) Inventors: Wei Huang, Shanghai (CN); Xiangfei Liu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 432 days.

(21) Appl. No.: 18/300,441

(22) Filed: Apr. 14, 2023

(65) Prior Publication Data

US 2023/0258825 A1 Aug. 17, 2023

Related U.S. Application Data

(63) Continuation of application No. PCT/CN2020/121306, filed on Oct. 15, 2020.

(51) Int. Cl.
*G01S 19/45* (2010.01)
*G01S 19/25* (2010.01)

(52) U.S. Cl.
CPC ............ *G01S 19/45* (2013.01); *G01S 19/256* (2013.01)

(58) Field of Classification Search
CPC .......... G01S 19/00; G01S 19/01; G01S 19/03; G01S 19/04; G01S 19/05; G01S 19/09;
(Continued)

(56) References Cited

U.S. PATENT DOCUMENTS 5,436,872 A * 7/1995 Gilmour ............. G01S 7/52003 367/103
7,602,334 B1 * 10/2009 Lorenz .................... G01S 19/46 342/357.29
(Continued)

FOREIGN PATENT DOCUMENTS

CN 103698773 A 4/2014
CN 105099498 A * 11/2015 ............. G01S 19/00
(Continued)

OTHER PUBLICATIONS

Extended European Search Report issued in EP20957169.4, dated Oct. 27, 2023, 9 pages.

*Primary Examiner* — Yuwen Pan
*Assistant Examiner* — Samuel H. Leonard

(57) ABSTRACT

A satellite signal processing method and a satellite positioning apparatus are disclosed, and relate to the field of communication technologies, to improve system performance and user experience when a radio navigation satellite system (RNSS) is integrated with a radio determination satellite system (RDSS). The satellite positioning apparatus includes: an RNSS radio frequency channel, configured to receive an RNSS received signal; an RNSS baseband processor, coupled to the RNSS radio frequency channel, and configured to perform position, velocity, and time (PVT) computation on the RNSS received signal to obtain PVT information; an RDSS baseband processor, configured to determine a carrier frequency of an RDSS received signal based on a carrier frequency offset value, where the carrier frequency offset value is generated based on the PVT information; and an RDSS radio frequency channel, coupled to the RDSS baseband processor, and configured to receive the RDSS received signal based on the carrier frequency of the RDSS received signal.

18 Claims, 8 Drawing Sheets

| | |
|---|---|
| Determine PVT information based on an RNSS received signal | S301 |
| Determine a carrier frequency offset value and a code phase offset value based on the PVT information | S302 |
| Receive and lock an RDSS received signal based on the carrier frequency offset value and the code phase offset value | S303 |

(58) Field of Classification Search
CPC .......... G01S 19/10; G01S 19/13; G01S 19/14; G01S 19/23; G01S 19/24; G01S 19/25; G01S 19/254; G01S 19/256; G01S 19/29; G01S 19/30; G01S 19/35; G01S 19/37; G01S 19/38; G01S 19/39; G01S 19/42; G01S 19/421; G01S 19/423; G01S 19/425; G01S 19/426; G01S 19/43; G01S 19/45; G01S 19/46; G01S 19/48; G01S 19/52; G01S 19/54; G01S 11/00; G01S 11/02; G01S 11/026; G01S 11/10
See application file for complete search history.

(56) References Cited

U.S. PATENT DOCUMENTS 10,645,561 B1 * 5/2020 Guo ........................ H04W 4/42
10,838,071 B1 * 11/2020 Dybdal .................. G01S 19/30
2001/0017598 A1 * 8/2001 Townsend .............. G01S 19/34 342/357.74
2002/0098816 A1 * 7/2002 Dooley .................. G01S 19/13 342/357.65
2002/0175855 A1 * 11/2002 Richton ................ G01S 5/0268 342/357.29
2010/0232351 A1 * 9/2010 Chansarkar ............ G01S 19/25 370/320
2011/0312320 A1 * 12/2011 Moeglein ............. G01S 19/252 455/427
2012/0112960 A1 * 5/2012 Joo ........................ G01S 19/25 342/357.31
2014/0035782 A1 * 2/2014 Fischer ................ G01S 19/252 342/357.43
2014/0145878 A1 * 5/2014 Barlett .................... G01S 19/09 342/357.46
2014/0375494 A1 * 12/2014 Fleming .................. G01S 19/52 342/357.29
2014/0375495 A1 * 12/2014 Fleming .................. G01S 19/14 342/357.32
2016/0124070 A1 * 5/2016 Afzal ...................... G01S 19/29 342/357.47
2016/0174037 A1 * 6/2016 Lu ......................... H04W 4/026 455/456.1
2017/0208600 A1 * 7/2017 Hsu ......................... G01S 11/10
2018/0048502 A1 * 2/2018 Floch ...................... G01S 19/30
2018/0210090 A1 * 7/2018 Soualle ................. G01S 19/396
2018/0376441 A1 * 12/2018 Reykowski ........ G01R 33/3692
2019/0277977 A1 * 9/2019 Jackson .................. G01S 19/23
2020/0025940 A1 * 1/2020 Nogues-Correig ..... G01S 19/23
2020/0242950 A1 * 7/2020 Guo ......................... G08G 5/22
2020/0271794 A1 * 8/2020 Sleewaegen ............ G01S 19/24
2021/0033736 A1 * 2/2021 Futami .................... G01S 19/37
2021/0048537 A1 * 2/2021 Marmet ................ G01S 19/243
2021/0157014 A1 * 5/2021 Cookman ............... H04W 4/40
2022/0276389 A1 * 9/2022 Yu ........................... G01S 19/21

FOREIGN PATENT DOCUMENTS

CN 105871495 A 8/2016
CN 109143285 A * 1/2019 ............ G01S 19/37

* cited by examiner

SATELLITE SIGNAL PROCESSING METHOD AND SATELLITE POSITIONING APPARATUS

CROSS-REFERENCE TO RELATED APPLICATIONS

This application is a continuation of International Application No. PCT/CN2020/121306, filed on Oct. 15, 2020, the disclosure of which is hereby incorporated by reference in its entirety.

TECHNICAL FIELD

The present disclosure relates to the field of communication technologies, and in particular, to a satellite signal processing method and a satellite positioning apparatus.

BACKGROUND

In a global navigation satellite system (GNSS), there are two types of satellite radio services that serve position determining of a subscriber terminal. One is a radio navigation satellite system (RNSS) in which the subscriber terminal receives a satellite signal and independently measures distances from the subscriber terminal to at least four satellites, and calculates a position, a velocity, and time of the subscriber terminal. The other is a radio determination satellite system (RDSS) in which measurement of a distance from the subscriber terminal to a satellite and position calculation cannot be independently completed by the subscriber terminal itself, and need to be completed by an external system based on a response from the subscriber terminal. Integration of the RNSS and the RDSS can provide a more stable and reliable received signal for the subscriber terminal, and provide low power consumption, low costs, high-precision positioning, and a communication capability.

In the conventional technology, a method for quickly positioning a subscriber terminal based on integration of an RNSS and an RDSS is provided. Specifically, after an RDSS module completes capture, tracking, and positioning computation of an RDSS signal, the RDSS module transmits time information obtained through the computation to an RNSS module for auxiliary positioning. Therefore, the RNSS module can reduce, based on the time information, uncertainty of time information required for navigation, to greatly reduce first capture time of an RNSS signal, so as to implement fast positioning of the RNSS.

However, because receive sensitivity of the RDSS signal is significantly lower than receive sensitivity of the RNSS signal, in some complex signal scenarios with serious blocking, the capture and the tracking of the RDSS signal may not be implemented due to low receive power of the RDSS, resulting in low performance of the integration of the RNSS and the RDSS.

SUMMARY

The present disclosure provides a satellite signal processing method and a satellite positioning apparatus, to improve system performance and user experience when an RNSS is integrated with an RDSS.

To achieve the foregoing objectives, the following technical solutions are used in embodiments of the present disclosure.

According to a first aspect, a satellite positioning apparatus is provided. The apparatus supports a radio navigation satellite system (RNSS) and a radio determination satellite system (RDSS), and the apparatus includes: an RNSS radio frequency channel, configured to receive an RNSS received signal, where the RNSS received signal may be an RNSS signal received by the apparatus from a satellite, and the RNSS signal may be a signal corresponding to the RNSS; an RNSS baseband processor, coupled to the RNSS radio frequency channel, and configured to perform position, velocity, and time (PVT) computation on the RNSS received signal, to obtain PVT information; an RDSS baseband processor, configured to determine a carrier frequency of an RDSS received signal based on a carrier frequency offset value, where the carrier frequency offset value is generated based on the PVT information, and the carrier frequency offset value refers to a frequency offset value of the carrier frequency of the RDSS received signal relative to a carrier frequency of an RDSS signal sent by the satellite; and an RDSS radio frequency channel, coupled to the RDSS baseband processor, and configured to receive the RDSS received signal based on the carrier frequency of the RDSS received signal.

In the foregoing technical solution, the carrier frequency offset value of the RDSS signal may be obtained based on the PVT information determined by the RNSS received signal, so that the carrier frequency of the RDSS received signal may be determined based on the carrier frequency offset value. That is, the carrier frequency offset value may be used to lock the carrier frequency of the RDSS received signal in a small frequency range, to pre-detect the RDSS received signal in the small frequency range, so as to shorten a duration of searching the degree of uncertainty for the carrier frequency and implement fast locking of the RDSS received signal. Therefore, hardware design complexity of the apparatus can be reduced, costs can be reduced, and power consumption of the apparatus can be further reduced.

In a possible implementation of the first aspect, the RDSS baseband processor is further configured to determine a code phase of the RDSS received signal based on a code phase offset value, where the code phase offset value is generated based on the PVT information; and the RDSS radio frequency channel is further configured to receive the RDSS received signal based on the code phase and the carrier frequency of the RDSS received signal. In the foregoing possible implementation, the code phase offset value may be used to lock a phase of a code element (or a chip) of the RDSS received signal within a small phase range, and pre-detect the RDSS received signal within the small phase range, to shorten a duration of searching the degree of uncertainty for the code element (or chip) phase.

In a possible implementation of the first aspect, the PVT information includes at least one of the following: position information, a movement velocity, and a clock frequency offset estimation value; and the clock frequency offset estimation value is a difference between a measured clock frequency and a reference clock frequency that are of the apparatus. The position information may be a position in which the apparatus receives the RNSS signal, the movement velocity may be a movement velocity at which the apparatus receives the RNSS signal, the time information may be time information of sending the RNSS signal by the satellite, or may be referred to as an observation moment, and the clock frequency offset estimation value may be an estimated offset value when an offset occurs in the clock frequency of the apparatus.

In a possible implementation of the first aspect, the RNSS baseband processor or the RDSS baseband processor is further configured to: determine a Doppler frequency offset value based on the movement velocity, and determine the carrier frequency offset value based on the Doppler frequency offset value and the clock frequency offset estimation value. Optionally, a sum of the Doppler frequency offset value and the clock frequency offset estimation value is the carrier frequency offset value. In the foregoing possible implementation, the carrier frequency offset value is determined, so that the apparatus can pre-detect the RDSS received signal in a small frequency range, to shorten a duration of searching the degree of uncertainty for the frequency.

In a possible implementation of the first aspect, the RNSS baseband processor or the RDSS baseband processor is further configured to: determine a signal propagation delay based on the position information, and determine the code phase offset value based on the signal propagation delay. Optionally, the code phase offset value is a product of the signal propagation delay and a code frequency. In the foregoing possible implementation, the code phase offset value is determined, so that the apparatus can pre-detect the RDSS received signal in a small phase range, to shorten a duration of searching the degree of uncertainty for the code element (or chip) phase.

In a possible implementation of the first aspect, the RDSS baseband processor is further configured to correct a carrier frequency of an RDSS transmitted signal based on the carrier frequency offset value, to obtain the RDSS transmitted signal; and the RDSS radio frequency channel is further configured to send the RDSS transmitted signal. In the foregoing possible implementation, the carrier frequency of the RDSS transmitted signal is corrected by using the carrier frequency offset value, so that frequency precision of the RDSS transmitted signal can be improved. Therefore, after the apparatus sends the RDSS transmitted signal, when an RDSS central station receives the RDSS transmitted signal, the RDSS central station may perform pre-detection near a system nominal value, so that the central station can complete capture of the RDSS transmitted signal with minimum resources, and a communication success rate is improved.

In a possible implementation of the first aspect, the apparatus is a satellite positioning chip or a satellite positioning device.

According to a second aspect, a satellite positioning apparatus is provided. The apparatus supports a radio navigation satellite system (RNSS) and a radio determination satellite system (RDSS), and the apparatus includes: an RNSS radio frequency channel, configured to receive an RNSS received signal, where the RNSS received signal may be an RNSS signal received by the apparatus from a satellite, and the RNSS signal may be a signal corresponding to the RNSS; an RNSS baseband processor, coupled to the RNSS radio frequency channel, and configured to perform position, velocity, and time (PVT) computation on the RNSS received signal, to obtain PVT information; an RDSS baseband processor, configured to correct a carrier frequency of an RDSS transmitted signal based on a carrier frequency offset value, to obtain the RDSS transmitted signal, where the carrier frequency offset value is generated based on the PVT information, and the carrier frequency offset value is a frequency offset value of the carrier frequency of the RDSS transmitted signal relative to a carrier frequency of an RDSS signal sent by the satellite; and an RDSS radio frequency channel, coupled to the RDSS baseband processor, and configured to send the RDSS transmitted signal. In the foregoing technical solution, after the carrier frequency offset value is determined based on the RNSS received signal, the carrier frequency of the RDSS transmitted signal is corrected by using the carrier frequency offset value, so that frequency precision of the RDSS transmitted signal can be improved. Therefore, after the apparatus sends the RDSS transmitted signal, when an RDSS central station receives the RDSS transmitted signal, the RDSS central station may perform pre-detection near a system nominal value, so that the central station can complete capture of the RDSS transmitted signal with minimum resources, and a communication success rate is improved.

In a possible implementation of the second aspect, the PVT information includes at least one of the following: a movement velocity and a clock frequency offset estimation value; and the clock frequency offset estimation value is a difference between a measured clock frequency and a reference clock frequency of that are the apparatus. The movement velocity may be a movement velocity at which the apparatus receives the RNSS signal, the time information may be time information of sending the RNSS signal by the satellite, or may be referred to as an observation moment, and the clock frequency offset estimation value may be an estimated offset value when an offset occurs in the clock frequency of the apparatus.

In a possible implementation of the second aspect, the RNSS baseband processor or the RDSS baseband processor is further configured to: determine a Doppler frequency offset value based on the movement velocity, and determine the carrier frequency offset value based on the Doppler frequency offset value and the clock frequency offset estimation value. Optionally, a sum of the Doppler frequency offset value and the clock frequency offset estimation value is the carrier frequency offset value. In the foregoing possible implementation, the carrier frequency of the RDSS transmitted signal is corrected by using the carrier frequency offset value, so that frequency precision of the RDSS transmitted signal can be improved. Therefore, after the apparatus sends the RDSS transmitted signal, when an RDSS central station receives the RDSS transmitted signal, the RDSS central station may perform pre-detection near a system nominal value, so that the central station can complete capture of the RDSS transmitted signal with minimum resources, and a communication success rate is improved.

In a possible implementation of the second aspect, the apparatus is a satellite positioning chip or a satellite positioning device.

According to a third aspect, a satellite signal processing method is provided. The method is applied to an apparatus supporting a radio navigation satellite system (RNSS) and a radio determination satellite system (RDSS), and the method includes: receiving an RNSS received signal, where the RNSS received signal may be an RNSS signal received by the apparatus from a satellite, and the RNSS signal may be a signal corresponding to the RNSS; performing position, velocity, and time (PVT) computation on the RNSS received signal, to obtain PVT information; determining a carrier frequency of an RDSS received signal based on a carrier frequency offset value, where the carrier frequency offset value is generated based on the PVT information, and the carrier frequency offset value refers to a frequency offset value of the carrier frequency of the RDSS received signal relative to a carrier frequency of an RDSS signal sent by the satellite; and receiving the RDSS received signal based on the carrier frequency of the RDSS received signal.

In a possible implementation of the third aspect, the method further includes: determining a code phase of the RDSS received signal based on a code phase offset value, where the code phase offset value is generated based on the PVT information; and receiving the RDSS received signal based on the code phase of the RDSS received signal and the carrier frequency.

In a possible implementation of the third aspect, the PVT information includes at least one of the following: position information, a movement velocity, and a clock frequency offset estimation value; and the clock frequency offset estimation value is a difference between a measured clock frequency and a reference clock frequency that are of the apparatus. The position information may be a position in which the apparatus receives the RNSS signal, the movement velocity may be a movement velocity at which the apparatus receives the RNSS signal, the time information may be time information of sending the RNSS signal by the satellite, or may be referred to as an observation moment, and the clock frequency offset estimation value may be an estimated offset value when an offset occurs in the clock frequency of the apparatus.

In a possible implementation of the third aspect, the method further includes: determining a Doppler frequency offset value based on the movement velocity, and determining the carrier frequency offset value based on the Doppler frequency offset value and the clock frequency offset estimation value. Optionally, a sum of the Doppler frequency offset value and the clock frequency offset estimation value is the carrier frequency offset value.

In a possible implementation of the third aspect, the method further includes: determining a signal propagation delay based on the position information, and determining the code phase offset value based on the signal propagation delay. Optionally, the code phase offset value is a product of the signal propagation delay and a code frequency.

In a possible implementation of the third aspect, the method further includes: correcting a carrier frequency of an RDSS transmitted signal based on the carrier frequency offset value, to obtain the RDSS transmitted signal; and sending the RDSS transmitted signal.

In a possible implementation of the third aspect, the apparatus is a satellite positioning chip or a satellite positioning device.

According to a fourth aspect, a satellite signal processing method is provided. The method is applied to an apparatus supporting a radio navigation satellite system (RNSS) and a radio determination satellite system (RDSS), and the method includes: receiving an RNSS received signal, where the RNSS received signal may be an RNSS signal received by the apparatus from a satellite, and the RNSS signal may be a signal corresponding to the RNSS; performing position, velocity, and time (PVT) computation on the RNSS received signal, to obtain PVT information; correcting a carrier frequency of an RDSS transmitted signal based on a carrier frequency offset value, to obtain the RDSS transmitted signal, where the carrier frequency offset value is generated based on the PVT information, and the carrier frequency offset value refers to a frequency offset value of the carrier frequency of the RDSS transmitted signal relative to a carrier frequency of an RDSS signal sent by the satellite; and sending the RDSS transmitted signal.

In a possible implementation of the fourth aspect, the PVT information includes at least one of the following: a movement velocity and a clock frequency offset estimation value; and the clock frequency offset estimation value is a difference between a measured clock frequency and a reference clock frequency of that are the apparatus. The movement velocity may be a movement velocity at which the apparatus receives the RNSS signal, the time information may be time information of sending the RNSS signal by the satellite, or may be referred to as an observation moment, and the clock frequency offset estimation value may be an estimated offset value when an offset occurs in the clock frequency of the apparatus.

In a possible implementation of the fourth aspect, the method further includes: determining a Doppler frequency offset value based on the movement velocity, and determining the carrier frequency offset value based on the Doppler frequency offset value and the clock frequency offset estimation value. Optionally, a sum of the Doppler frequency offset value and the clock frequency offset estimation value is the carrier frequency offset value.

In a possible implementation of the fourth aspect, the apparatus is a satellite positioning chip or a satellite positioning device.

According to a fifth aspect, a satellite positioning system is provided. The system includes an antenna and the satellite positioning system according to the first aspect or any possible implementation of the first aspect.

According to a sixth aspect, a satellite positioning system is provided. The system includes an antenna and the satellite positioning system according to the second aspect or any possible implementation of the second aspect.

According to another aspect of the present disclosure, a computer-readable storage medium is provided, configured to store a computer program. When the computer program is run on a computer, the computer is enabled to perform the satellite signal processing method according to the third aspect or any possible implementation of the third aspect.

According to another aspect of the present disclosure, a computer-readable storage medium is provided, configured to store a computer program. When the computer program is run on a computer, the computer is enabled to perform the satellite signal processing method according to the fourth aspect or any possible implementation of the fourth aspect.

According to another aspect of the present disclosure, a computer program product is provided. When the computer program product runs on a computer, the computer is enabled to perform the satellite signal processing method according to the third aspect or any possible implementation of the third aspect.

According to another aspect of the present disclosure, a computer program product is provided. When the computer program product runs on a computer, the computer is enabled to perform the satellite signal processing method according to the fourth aspect or any possible implementation of the fourth aspect.

It may be understood that any one of the satellite signal processing method, satellite positioning system, computer-readable storage medium, or computer program product provided above includes a function of the satellite positioning apparatus provided above. Therefore, for beneficial effects that can be achieved by the satellite signal processing method, the satellite positioning system, the computer-readable storage medium, or the computer program product, refer to the beneficial effects in the satellite positioning apparatus provided above.

DESCRIPTION OF EMBODIMENTS

In the present disclosure, "at least one" means one or more, and "a plurality of" means two or more. A term "and/or" describes an association relationship between associated objects, and indicates that three relationships may exist. For example, A and/or B may indicate the following three cases: A exists alone, both A and B exist, and B exists alone, where A and B may be singular or plural. A character "/" usually indicates an "or" relationship between associated objects. In addition, in embodiments of the present disclosure, terms such as "first" and "second" do not limit a quantity and an execution order.

Before embodiments of the present disclosure are described, related technical terms in the present disclosure are described first.

A global navigation satellite system (GNSS) is a satellite-based radio navigation system that uses an artificial earth satellite as a navigation station to provide all-weather and high-precision position (P), velocity V), and time (T) information for various military and civilian carriers on land, by sea, in the air, and in space. The position, velocity and time information may be referred to as PVT information for short.

In the GNSS, there are two types of satellite radio services that serve position determining of a subscriber terminal. One is a radio navigation satellite system (RNSS) in which the subscriber terminal receives a satellite signal and independently measures distances to at least four satellites, and calculates a position, a velocity, and time of the subscriber terminal. The other is a radio determination satellite system (RDSS) in which distance measurement from the subscriber terminal to the satellite and position calculation cannot be independently completed by the subscriber terminal itself, but need to be completed by an external system through a response from the subscriber terminal. Integration of the RNSS and the RDSS can provide a more stable and reliable received signal for the subscriber terminal, and provide low power consumption, low costs, and high-precision positioning and a communication capability.

Figure 1:
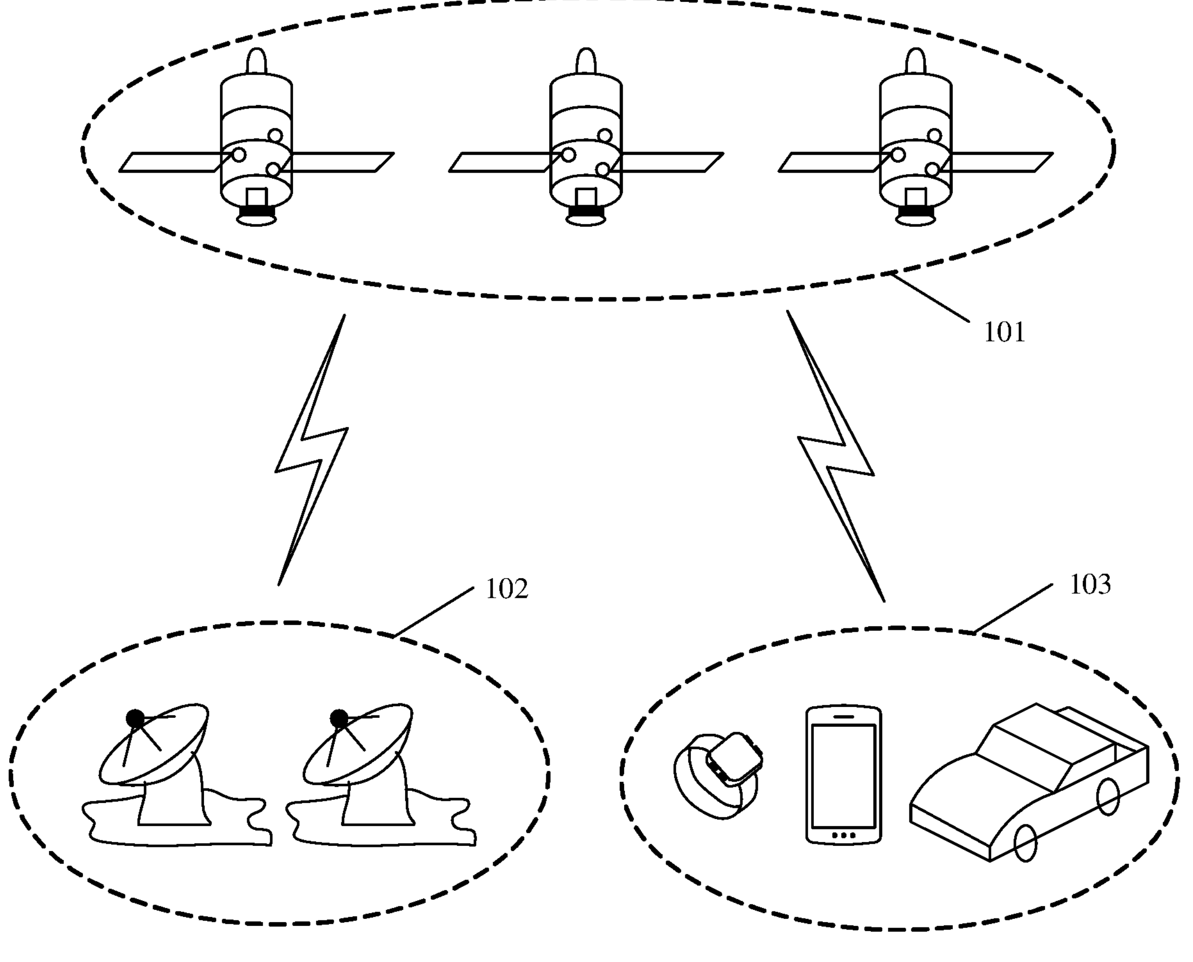
FIG. 1 is a schematic diagram of an architecture of a GNSS according to an embodiment of the present disclosure.

FIG. 1 is a schematic diagram of an architecture of a GNSS according to an embodiment of the present disclosure. The GNSS may include a space part 101, a ground control part 102, and a user part 103. The space part 101 may include a satellite group that flies around the earth in the air, and the satellite group may include a plurality of satellites, which may be configured to provide ephemeris and time information, transmit a pseudorange and a carrier signal, and provide other service information. For example, the plurality of satellites may include a plurality of geostationary earth orbit (GEO) satellites. The ground control part 102 may include a central station or the like, and is configured to implement time synchronization, satellite tracking for orbit determination, and the like. The user part 103 may include subscriber terminals such as a user navigation terminal and a navigation receiver, and is configured to receive, measure, and compute a satellite navigation signal.

Embodiments of the present disclosure may be applied to a subscriber terminal of a global navigation satellite system (GNSS), and the subscriber terminal may support both a radio determination satellite system (RDSS) and a radio navigation satellite system (RNSS), and the RNSS and the RDSS share a same clock. Optionally, the subscriber terminal may be a multi-mode multi-frequency receiver, that is, the subscriber terminal may be configured to receive GNSS navigation signals in a plurality of different modes, or may be further configured to receive GNSS navigation signals of a plurality of different frequencies in a same mode. For example, the subscriber terminal is a multi-frequency receiver of a BeiDou navigation satellite system, and may be configured to receive GNSS navigation signals of one or more frequencies in B1I, B1C, B2a or B2b. The multi-mode may include one or more global positioning system modes such as a BeiDou navigation satellite system, a global positioning system (GPS), Glonass (GLONASS), and Galileo (GALILEO), and may further include positioning system modes within one or more regions, such as a quasi-zenith satellite system (QZSS) and an Indian regional navigation satellite system (India RNSS, IRNSS). In actual application, the subscriber terminal may be a navigator, a mobile phone, a tablet computer, a computer, an intelligent wearable device, a vehicle-mounted device, a portable device, or the like, or the subscriber terminal may be a chip built in the foregoing device. For ease of description, the device and the chip mentioned above may be collectively referred to as satellite positioning devices.

Figure 2:
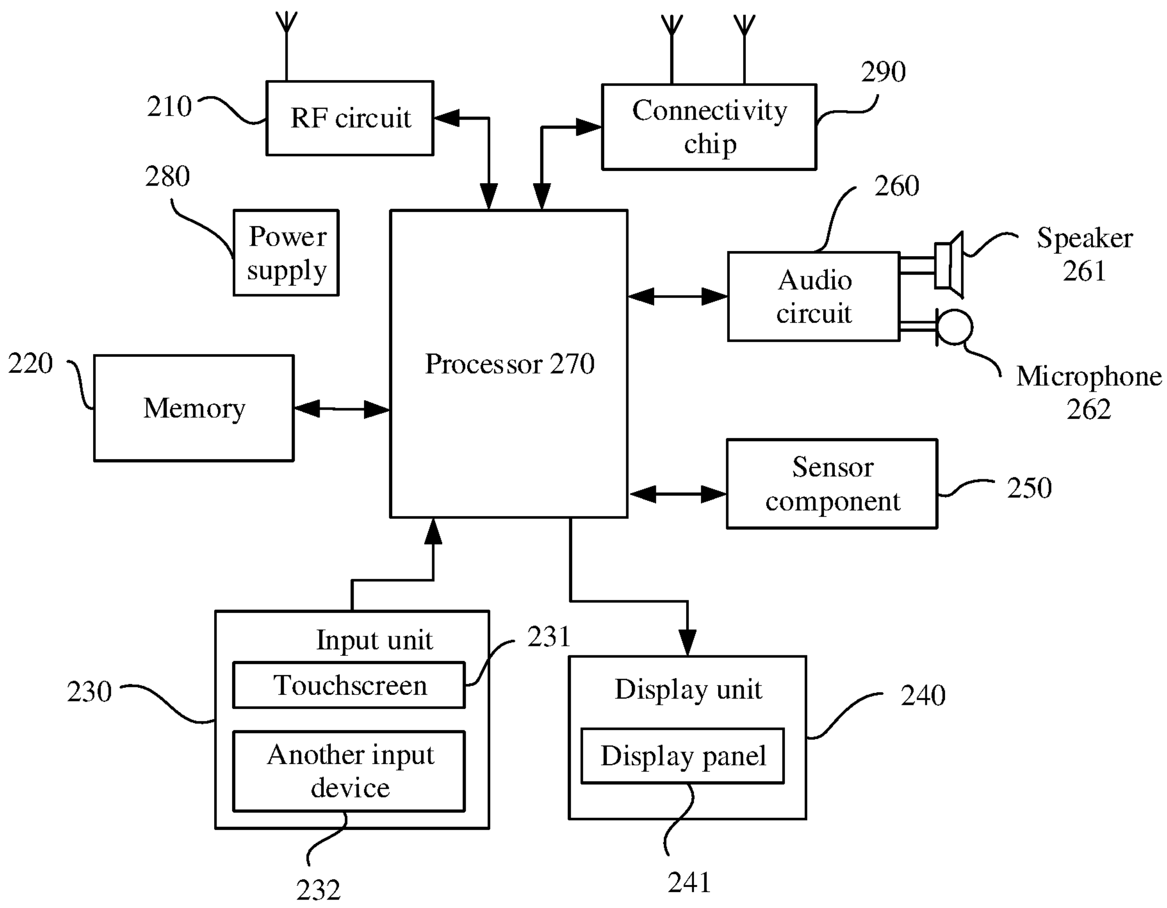
FIG. 2 is a schematic diagram of a structure of a mobile phone according to an embodiment of the present disclosure.

FIG. 2 is a schematic diagram of a structure of a satellite positioning apparatus according to an embodiment of the present disclosure. The satellite positioning apparatus is described by using a mobile phone as an example. The mobile phone includes components such as a radio frequency (RF) circuit 210, a memory 220, an input unit 230, a display unit 240, a sensor component 250, an audio circuit 260, a processor 270, and a power supply 280. A person skilled in the art may understand that the structure of the mobile phone shown in FIG. 2 does not constitute a limitation on the mobile phone, and the mobile phone may include more or fewer components than those shown in the figure, or combine some components, or have different component arrangements.

The following describes the components of the mobile phone in detail with reference to FIG. 2.

The RF circuit 210 may be configured to receive a signal and send a signal in an information sending and receiving process or a call process. Usually, the RF circuit 210 includes but is not limited to an antenna, at least one amplifier, a transceiver, a coupler, an LNA (low noise amplifier, low noise amplifier), a duplexer, and the like. Optionally, the antenna may include a plurality of receive antennas and a plurality of transmit antennas. In addition, the RF circuit 210 may further communicate with a network and another device through wireless communication. The wireless communication may use any communication standard or protocol, including but not limited to a global system for mobile communication (GSM), a general packet radio service (GPRS), code division multiple access (CDMA), wideband code division multiple access (WCDMA), long term evolution (LTE), and the like.

The memory 220 may be configured to store a software program and a module. The processor 270 performs various function applications of the mobile phone and data processing by running the software program and the module that are stored in the memory 220. The memory 220 may mainly include a program storage area and a data storage area. The program storage area may store an operating system, an application program required by at least one function, and the like. The data storage area may store data (such as audio data, image data, and an address book) and the like created during use of the mobile phone. In addition, the memory 220 may include a high-speed random access memory, and may further include a nonvolatile memory, for example, at least one magnetic disk storage device, a flash storage device, or another volatile solid-state storage device.

The input unit 230 may be configured to: receive entered number or character information, and generate a key signal input related to a user setting and function control of the mobile phone. Specifically, the input unit 230 may include a touchscreen 231 and another input device 232. The touchscreen 231, also referred to as a touch panel, may collect a touch operation (for example, an operation performed by a user on or near the touchscreen 231 by using any proper object or accessory such as a finger or a stylus) performed by the user on or near the touchscreen 231, and drive a corresponding connection apparatus by using a preset program. The another input device 232 may include but is not limited to one or more of a physical keyboard, a function key (such as a volume control key or a power on/off key), a trackball, a mouse, a joystick, and the like.

The display unit 240 may be configured to display information entered by the user or information provided for the user, and various menus of the mobile phone. The display unit 240 may include a display panel 241. Optionally, the display panel 241 may be configured in a form of a liquid crystal display (LCD), an organic light-emitting diode (OLED), or the like. Further, the touchscreen 231 may cover the display panel 241. When detecting the touch operation on or near the touchscreen 231, the touchscreen 231 transfers the touch operation to the processor 270 to determine a type of a touch event, and then the processor 270 provides a corresponding visual output on the display panel 241 based on the type of the touch event. Although the touchscreen 231 and the display panel 241 are used as two independent components in FIG. 2 to implement input and output functions of the mobile phone, in some embodiments, the touchscreen 231 and the display panel 241 may be integrated to implement the input and output functions of the mobile phone.

The sensor component 250 includes one or more sensors, and is configured to provide status evaluation in various aspects for the mobile phone. The sensor component 250 may include an acceleration sensor, a gyro sensor, a magnetic sensor, a pressure sensor, or a temperature sensor. The sensor component 250 may detect acceleration/deceleration of the mobile phone, an orientation of the mobile phone, an on/off state of the mobile phone, relative positioning of the component, a temperature change of the mobile phone, or the like. In addition, the sensor component 250 may further include an optical sensor, for example, a CMOS or CCD image sensor, configured for use in an imaging application.

The audio circuit 260, a speaker 261, and a microphone 262 may provide an audio interface between the user and the mobile phone. The audio circuit 260 may convert received audio data into an electrical signal and transmit the electrical signal to the speaker 261, and the speaker 261 converts the electrical signal into a sound signal for output. In addition, the microphone 262 converts a collected sound signal into an electrical signal, and the audio circuit 260 receives the electrical signal, converts the electrical signal into audio data, and then outputs the audio data to the RF circuit 210, to send the audio data to, for example, another mobile phone, or outputs the audio data to the memory 220 for further processing.

The processor 270 is a control center of the mobile phone. The processor 270 is connected to all parts of the entire mobile phone by using various interfaces and lines, and performs various functions of the mobile phone and data processing by running or executing the software program and/or the module stored in the memory 220 and invoking data stored in the memory 220, to perform overall monitoring on the mobile phone. Optionally, the processor 270 may include one or more processing units. Preferably, an application processor and a modem processor may be integrated into the processor 270. The application processor mainly processes an operating system, a user interface, an application, and the like. The modem processor mainly processes wireless communication. It may be understood that the modem processor may not be integrated into the processor 270.

The mobile phone further includes the power supply 280 (for example, a battery) that supplies power to each component. Preferably, the power supply may be logically connected to the processor 270 through a power management system, to implement functions such as charging management, discharging management, and power consumption management through the power management system.

Further, the mobile phone may further include a connectivity chip 290, and a GNSS module supporting both an RDSS and an RNSS may be integrated into the connectivity chip 290. Optionally, the connectivity chip 290 may further integrate one or more of a wireless fidelity (Wi-Fi) module, a Bluetooth module, a near field communication (NFC) module, or a frequency modulation (FM) module.

Figure 3:
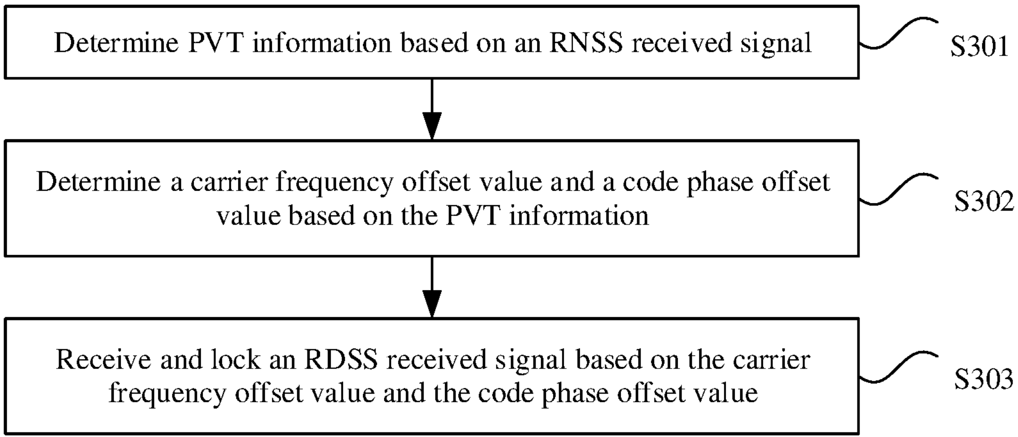
FIG. 3 is a schematic flowchart of a satellite signal processing method according to an embodiment of the present disclosure.

FIG. 3 is a schematic flowchart of a satellite signal processing method according to an embodiment of the present disclosure. The method may be applied to a satellite positioning apparatus supporting an RNSS and an RDSS. The RNSS and the RDSS share a same clock. The apparatus may be a subscriber terminal or a chip built in the subscriber terminal. Refer to FIG. 3. The method includes the following steps.

S301: Determine PVT information based on an RNSS received signal.

An RNSS signal may be a signal corresponding to the RNSS, and the RNSS received signal may be the RNSS signal received by the satellite positioning apparatus from a satellite. A BeiDou navigation satellite system is used as an example. The RNSS received signal may be a signal, of a frequency such as B1I, B1C, B2a, or B2b, that corresponds to the RNSS and that is sent by the satellite. An RNSS transmitted signal may be a signal, of a frequency such as B1I, B1C, B2a, or B2b, that corresponds to the RNSS and that is sent by the satellite positioning apparatus. Similarly, an RDSS signal in following descriptions may be a signal corresponding to the RDSS, an RDSS received signal may be an RDSS signal received by the satellite positioning apparatus from the satellite, and an RDSS transmitted signal may be an RDSS signal sent by the satellite positioning apparatus to the satellite.

In addition, the PVT information is position, velocity, and time (PVT) information, and the PVT information may include one or more pieces of information such as position information of the apparatus, a movement velocity, time information, and a clock frequency offset estimation value of the apparatus. The position information of the apparatus may be a position in which the satellite positioning apparatus receives the RNSS signal; the movement velocity of the apparatus may be a movement velocity at which the satellite positioning apparatus receives the RNSS signal; the time information may be time information of sending the RNSS signal by the satellite, or may be referred to as an observation moment; and the clock frequency offset estimation value may be an estimated offset value when an offset occurs in a clock frequency of the apparatus, where the clock frequency offset estimation value is a difference between a measured clock frequency and a reference clock frequency that are of the apparatus.

Specifically, the satellite positioning apparatus may include an RNSS receiver (RX), and the apparatus may receive and process the RNSS received signal by using the RNSS RX, to obtain the PVT information. For example, the RNSS RX may be configured to perform front-end processing on the RNSS received signal. For example, the front-end processing may include processing such as radio frequency receiving, analog-to-digital (AD) conversion, filtering, or down-conversion. Then, processing such as capture, tracking, synchronization, decoding, or PVT computation is performed on a processed RNSS received signal, to obtain the PVT information.

Figure 4:
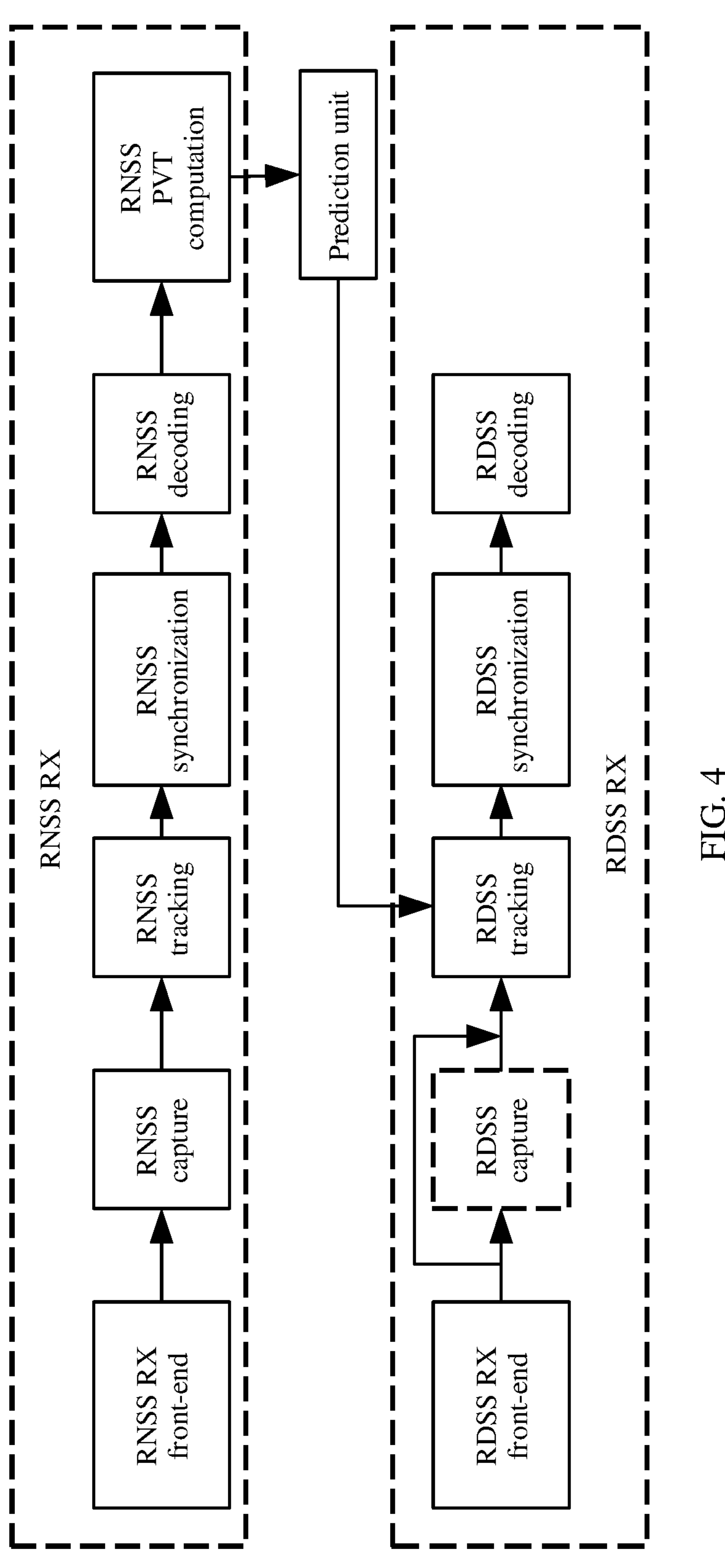
FIG. 4 is a schematic diagram of a satellite positioning apparatus according to an embodiment of the present disclosure.

For example, as shown in FIG. 4, the apparatus includes an RNSS RX, and the RNSS RX includes an RNSS RX front-end module, an RNSS capture module, an RNSS tracking module, an RNSS synchronization module, an RNSS decoding module, and a PVT computation module. The RNSS RX front-end module may also be referred to as an RNSS radio frequency channel. The RNSS capture module, the RNSS tracking module, the RNSS synchronization module, the RNSS decoding module, and the PVT computation module are integrated together, and may also be referred to as an RNSS baseband processor. Specifically, the RNSS RX front-end module is configured to implement processing such as radio frequency receiving, AD conversion, filtering, and down-conversion on the RNSS received signal, and transmit a processed RNSS received signal to the RNSS capture module. The RNSS capture module performs two-bit search based on uncertainty of the RNSS received signal on a carrier frequency and a code phase, detects validity of the RNSS received signal, and determines a specific carrier frequency offset, a code phase offset value, and the like. The RNSS tracking module is configured to implement real-time tracking of a change of the carrier frequency and the code phase of the RNSS received signal, and complete despreading and demodulation of the RNSS received signal. The RNSS synchronization module performs bit synchronization and frame synchronization processing based on demodulated data of the RNSS tracking module, to find a bit boundary and a frame header of the demodulated data, so as to determine a navigation message. The RNSS decoding module is configured to parse the navigation message, calculate a satellite position, and calculate a pseudorange, and the like. The PVT computation module computes the position, velocity and time of the apparatus based on a computation result of the RNSS decoding module.

S302: Determine the carrier frequency offset value and the code phase offset value based on the PVT information.

The carrier frequency offset and the code phase offset are an embodiment of the Doppler effect in the radio field, and are caused by a relative motion between a transmitter and a receiver. The carrier frequency offset may mean that an offset occurs between a signal carrier frequency received by the receiver and a signal carrier frequency transmitted by the transmitter, and the carrier frequency offset value is a frequency offset value when the offset occurs. The code phase offset may mean that an offset occurs between a signal code element (or a chip) received by the receiver and a signal code element (or a chip) transmitted by the transmitter, and the code phase offset value is a phase offset value of the code element (or the chip) when the offset occurs.

In addition, the carrier frequency offset value is a carrier frequency offset value of the RDSS received signal, and is specifically a frequency offset value of a carrier frequency of the RDSS received signal relative to a carrier frequency of the RDSS signal sent by the satellite. The code phase offset value is a code phase offset value of the RDSS received signal, and is specifically an offset value of a code phase of the RDSS received signal relative to a code phase of the RDSS signal sent by the satellite.

For example, as shown in FIG. 4, the apparatus may further include a prediction unit. The prediction unit receives the PVT information transmitted by the RNSS RX, and determines the carrier frequency offset value and the code phase offset value based on the following implementations. Optionally, the prediction unit may also be integrated into the RNSS baseband processor, or integrated into an RDSS baseband processor in following descriptions.

In a possible implementation, the PVT information may include the movement velocity and the clock frequency offset estimation value of the apparatus, and the carrier frequency offset value may be determined based on the movement velocity and the clock frequency offset estimation value. Specifically, a Doppler frequency offset value caused by a relative motion between the apparatus and a GEO satellite is determined based on the movement velocity and a motion status of the GEO satellite that provides an RNSS service, and the carrier frequency offset value is determined based on the Doppler frequency offset value and the clock frequency offset estimation value.

For example, the Doppler frequency offset value $f_d$ may satisfy the following Formula (1). In the formula, v represents the movement velocity of the apparatus, $v^{(n)}$ represents a running velocity of an $n^{th}$ GEO satellite, and I(n) represents a unit observation vector of the $n^{th}$ GEO satellite in the apparatus.

$$f_d = \frac{\left(v - v^{(n)}\right) \times I(n)}{\lambda} \quad (1)$$

For example, the carrier frequency offset value $f_{c\_offset}$ may satisfy the following Formula (2). In the formula, $f_d$ represents the Doppler frequency offset value, and $\delta \cdot f_\mu$ represents the clock frequency offset estimation value.

$$f_{c\_offset} = f_d + \delta \cdot f_\mu \quad (2)$$

In another possible implementation, the PVT information may further include the position information of the apparatus, and the code phase offset value may be determined based on the position information. Specifically, a propagation distance between the apparatus and the GEO satellite is determined based on the position information and position coordinates of the GEO satellite that provides the RNSS service, a signal propagation delay is determined based on the propagation distance, and a code phase offset value when the RDSS signal arrives at the apparatus is determined based on the signal propagation delay.

The RDSS signal is sent by a central station to the satellite and then forwarded by the satellite, while the RNSS signal is directly generated and broadcast on the satellite. Therefore, an uplink propagation delay from the central station to the satellite and an on-satellite forwarding delay need to be considered in a total delay of propagation of the RDSS signal. Because a position of the central station is fixed and an orbit of the GEO satellite is fixed, both the uplink propagation delay and the on-satellite forwarding delay can be estimated and compensated. Finally, the code phase offset of the RDSS signal may be specifically determined based on the position of the GEO satellite, the signal propagation delay, the uplink propagation delay, and the on-satellite forwarding delay.

For example, the total delay of the propagation of the RDSS signal $\Delta\tau$ may satisfy the following Formula (3). In the formula, $\Delta\tau_{up}$ represents the uplink propagation delay, $\Delta\tau_{down}$ represents the signal propagation delay, and $\Delta\tau_{tran}$ represents the on-satellite forwarding delay. For example, the code phase offset $\varphi_{code}$ may satisfy the following Formula (4). In the formula, $\Delta\tau$ represents the total delay of the propagation of the RDSS signal, and $f_{code}$ represents a code frequency.

$$\Delta\tau=\Delta\tau_{up}+\Delta\tau_{down}+\Delta\tau_{tran} \tag{3}$$

$$\varphi_{code}=\Delta\tau\times f_{code} \tag{4}$$

S303: Receive and lock the RDSS received signal based on the carrier frequency offset value and the code phase offset value.

The carrier frequency offset value may be used to lock a carrier frequency of the RDSS received signal within a small frequency range, to pre-detect the RDSS received signal within the small frequency range, so as to shorten a duration of searching the degree of uncertainty of the carrier frequency. The code phase offset value may be used to lock a phase of a code element (or a chip) of the RDSS received signal within a small phase range, and pre-detect the RDSS received signal within the small phase range, to shorten a duration of searching the degree of uncertainty for the code element (or chip) phase.

Specifically, the satellite positioning apparatus may include an RDSS receiver (RX), and the apparatus may receive and lock the RDSS received signal by using the RDSS RX. For example, the RDSS RX may be configured to perform front-end processing on the RDSS received signal. For example, the front-end processing may include processing such as radio frequency receiving, AD conversion, filtering, and down-conversion. Then, the frequency range and the phase range of the code element (or the chip) of the RDSS received signal are determined based on the carrier frequency offset value and the code phase offset value, to perform processing such as tracking, synchronization, and decoding on the RDSS received signal in a corresponding range, so as to obtain data information of the RDSS received signal.

For example, as shown in FIG. 4, the apparatus may further include an RDSS RX, and the RDSS RX includes an RDSS RX front-end module, an RDSS tracking module, an RDSS synchronization module, and an RDSS decoding module. The RDSS RX front-end module may also be referred to as an RDSS radio frequency channel. The RDSS tracking module, the RDSS synchronization module, and the RDSS decoding module are integrated together, and may also be referred to as the RDSS baseband processor. Specifically, functions of the RDSS RX front-end module, the RDSS synchronization module, and the RDSS decoding module are similar to the functions of the corresponding RNSS RX front-end module, the RNSS synchronization module, and the RNSS decoding module in the RNSS RX in FIG. 4. A function of the RDSS tracking module is slightly different from the function of the RNSS tracking module. The RDSS tracking module may quickly implement real-time tracking of the RDSS received signal based on the carrier frequency offset value and the code phase offset value that are determined in S302. Therefore, duration of locking the RDSS received signal can be shortened. Optionally, the RDSS RX may also include an RDSS capture module. Specifically, functions of the RDSS capture module are similar to the functions of the corresponding RNSS capture module in the RNSS RX in FIG. 4.

In this embodiment, the carrier frequency offset value and the code phase offset value of the RDSS signal may be obtained based on the PVT information determined by the RNSS received signal, so that fast locking of the RDSS received signal can be implemented based on the carrier frequency offset value and the code phase offset value. That is, the carrier frequency offset value may be used to lock the carrier frequency of the RDSS received signal within a small frequency range, and the code phase offset value may be used to lock the phase of the code element (or the chip) of the RDSS received signal within a small phase range. Therefore, search duration of the carrier frequency and the code phase is shortened, hardware design complexity of the satellite positioning apparatus is reduced, costs are reduced, and power consumption of the apparatus can be further reduced.

Figure 5:
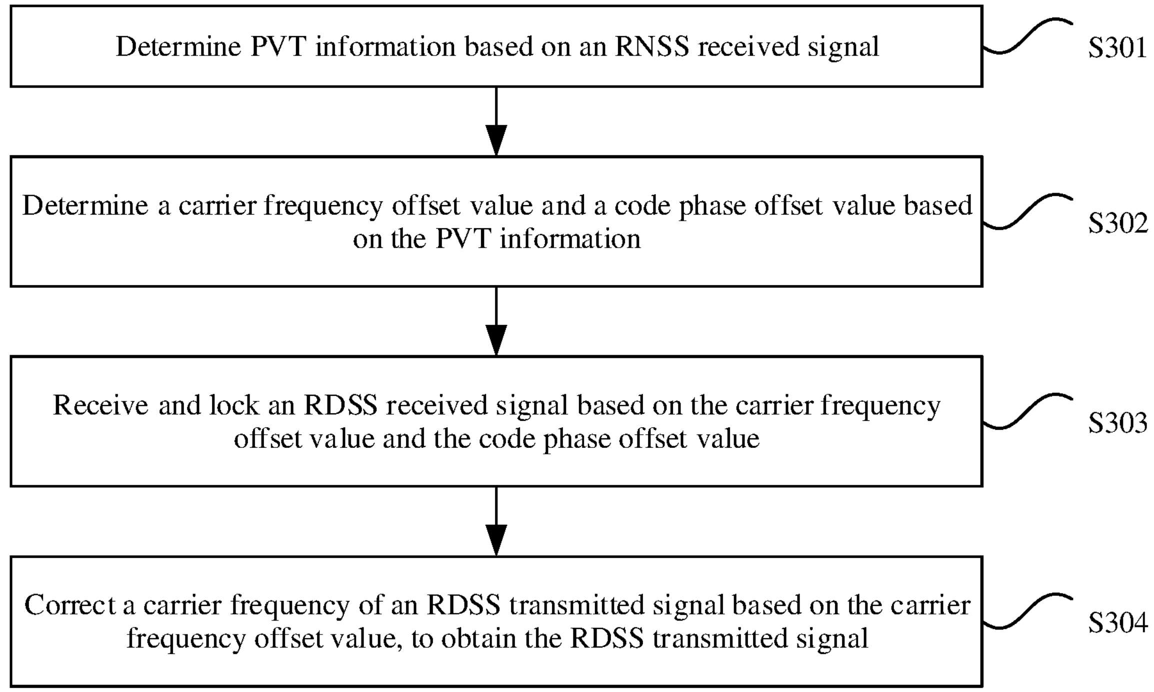
FIG. 5 is a schematic flowchart of another satellite signal processing method according to an embodiment of the present disclosure.

Further, as shown in FIG. 5, after S302, the method further includes S304. S303 and S304 may be performed in no sequence. In FIG. 5, an example in which S304 is performed after S303 is used for description.

S304: Correct a carrier frequency of an RDSS transmitted signal based on the carrier frequency offset value, to obtain the RDSS transmitted signal.

The RDSS transmitted signal may be an RDSS signal sent by the apparatus to a satellite. Because there is a relative motion between the apparatus and the satellite, there is also a deviation between the carrier frequency of the transmitted signal and a carrier frequency of the RDSS signal received by the satellite, so that the apparatus may correct the carrier frequency of the RDSS transmitted signal based on the carrier frequency offset value and corrected carrier frequency of the RDSS transmitted signal is close to a system nominal value. The system nominal value is a reference frequency defined by a system. After receiving the RDSS transmitted signal sent by the apparatus, the satellite may forward the transmitted signal to the central station, and the central station performs pre-detection near the system nominal value, so that the central station can complete capture of the RDSS transmitted signal with minimum resources and the signal capture duration is reduced.

Specifically, the apparatus may further include an RDSS transmitter (TX), and the apparatus may generate and send the RDSS transmitted signal by using the RDSS TX. For example, the RDSS TX may be configured to perform RDSS channel encoding, RDSS modulation, and RDSS shaping and filtering processing on original bit stream information, to obtain an RDSS baseband signal. Then, the RDSS TX performs RDSS TX carrier modulation on the RDSS baseband signal based on the carrier frequency offset value, and performs a series of RDSS TX front-end processing such as digital-to-analog (DA) conversion, up-conversion, and amplification on a modulated signal, to obtain the RDSS transmitted signal. Further, the apparatus may further send the RDSS transmitted signal by using an antenna.

Figure 6:
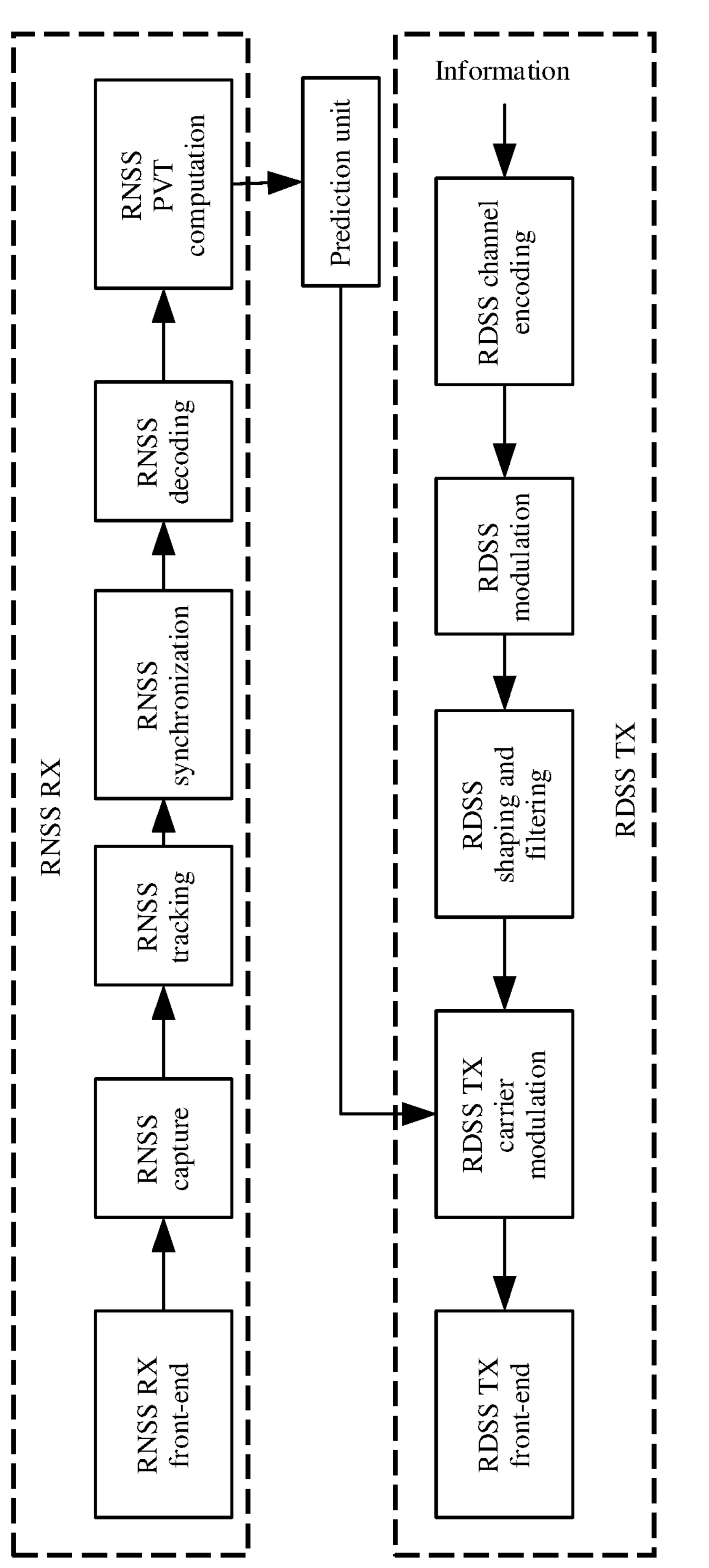
FIG. 6 is a schematic diagram of another satellite positioning apparatus according to an embodiment of the present disclosure.

For example, with reference to FIG. 4, as shown in FIG. 6, the apparatus may include an RDSS TX, and the RDSS TX includes an RDSS TX front-end module, an RDSS TX carrier modulation module, an RDSS shaping and filtering module, an RDSS modulation module, and an RDSS channel encoding module. The RDSS TX front-end module may also be referred to as an RDSS radio frequency channel. The RDSS TX carrier modulation module, the RDSS shaping and filtering module, the RDSS modulation module, and the RDSS channel encoding module are integrated together, and may also be referred to as an RDSS baseband processor. Specifically, the RDSS channel encoding module is configured to perform channel encoding on original bit stream information, to ensure that a preset channel encoding gain is obtained by corresponding decoding at a receive end of an RDSS central station. The RDSS modulation module is configured to perform spreading and modulation processing on encoded symbol data. The RDSS shaping and filtering module is configured to perform shaping and filtering on a spectrum of a modulated signal, and eliminate intersymbol interference, to obtain an RDSS baseband signal. The RDSS TX carrier modulation module is configured to perform carrier modulation on the RDSS baseband signal based on the carrier frequency offset value, to ensure that a carrier frequency of an RDSS intermediate frequency signal obtained after the modulation is close to the system nominal value. The RDSS TX front-end module is configured to perform a series of processing such as DA conversion, up-conversion, and amplification on the RDSS intermediate frequency signal, to obtain an RDSS transmitted signal satisfying a predetermined power strength. Further, the apparatus may send the RDSS transmitted signal by using an antenna.

In this embodiment, after the carrier frequency offset value is determined, the carrier frequency of the RDSS transmitted signal is corrected by using the carrier frequency offset value, so that frequency precision of the RDSS transmitted signal can be improved. Therefore, after the apparatus sends the RDSS transmitted signal, when the RDSS central station receives the RDSS transmitted signal, the RDSS central station may perform pre-detection near the system nominal value, so that the central station can complete capture of the RDSS transmitted signal with minimum resources, and a communication success rate is improved.

Figure 7:
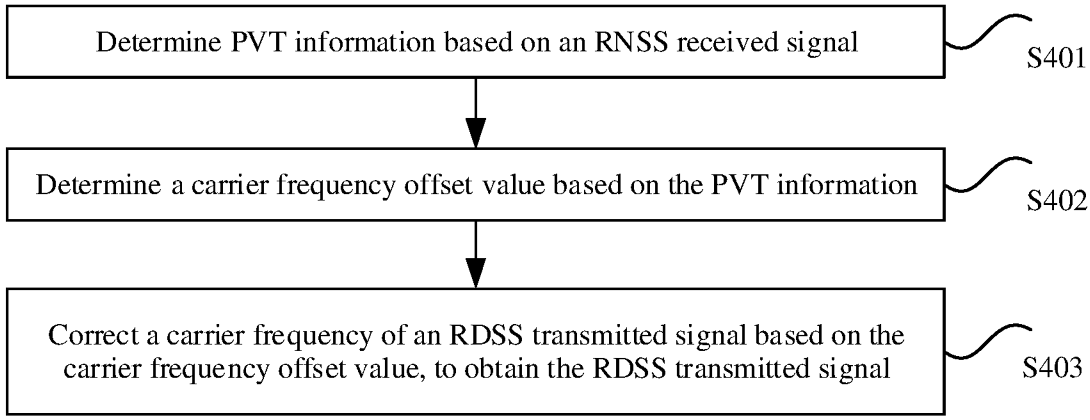
FIG. 7 is a schematic diagram of still another satellite signal processing method according to an embodiment of the present disclosure.

FIG. 7 is a schematic flowchart of another signal processing method according to an embodiment of the present disclosure. The method may be applied to a satellite positioning apparatus supporting an RNSS and an RDSS. The RNSS and the RDSS share a same clock. The apparatus may be a subscriber terminal or a chip built in the subscriber terminal. Refer to FIG. 7. The method includes the following steps.

S401: Determine PVT information based on an RNSS received signal.

An RNSS signal may be a signal corresponding to the RNSS, and the RNSS received signal may be the RNSS signal received by the satellite positioning apparatus from a satellite. Similarly, an RDSS signal in following descriptions may be a signal corresponding to the RDSS, an RDSS received signal may be an RDSS signal received by the satellite positioning apparatus from the satellite, and an RDSS transmitted signal may be an RDSS signal sent by the satellite positioning apparatus to the satellite.

In addition, the PVT information may include one or more pieces of information such as position information of the apparatus, a movement velocity, time information, and a clock frequency offset estimation value of the apparatus. The position information of the apparatus may be a position in which the satellite positioning apparatus receives the RNSS signal, the movement velocity of the apparatus may be a movement velocity at which the satellite positioning apparatus receives the RNSS signal, the time information may be time information of sending the RNSS signal by the satellite, or may be referred to as an observation moment, and the clock frequency offset estimation value may be an estimated offset value when an offset occurs in a clock frequency of the apparatus, where the clock frequency offset estimation value is a difference between a measured clock frequency and a reference clock frequency that are of the apparatus.

Specifically, the satellite positioning apparatus may include an RNSS receiver (RX), and the apparatus may receive and process the RNSS received signal by using the RNSS RX, to obtain the PVT information. For example, as shown in FIG. 6, the apparatus includes an RNSS RX, and the RNSS RX includes an RNSS RX front-end module, an RNSS capture module, an RNSS tracking module, an RNSS synchronization module, an RNSS decoding module, and a PVT computation module. The RNSS RX front-end module may also be referred to as an RNSS radio frequency channel. The RNSS capture module, the RNSS tracking module, the RNSS synchronization module, the RNSS decoding module, and the PVT computation module are integrated together, and may also be referred to as an RNSS baseband processor. Specifically, the RNSS RX front-end module is configured to implement processing such as radio frequency receiving, AD conversion, filtering, and down-conversion on the RNSS received signal, and transmit a processed RNSS received signal to the RNSS capture module. The RNSS capture module performs two-bit search based on uncertainty of the RNSS received signal on a carrier frequency and a code phase, detects validity of the RNSS received signal, and determines a specific carrier frequency offset, a code phase offset value, and the like. The RNSS tracking module is configured to implement real-time tracking of a carrier frequency and a code phase change of the RNSS received signal, and complete despreading and demodulation of the RNSS received signal. The RNSS synchronization module performs bit synchronization and frame synchronization processing based on demodulated data of the RNSS tracking module, to find a bit boundary and a frame header of the demodulated data, so as to determine a navigation message. The RNSS decoding module is configured to parse the navigation message, calculate a satellite position, calculate a pseudorange, and the like. The PVT computation module computes the position, movement velocity and time of the apparatus based on a calculation result of the RNSS decoding module.

S402: Determine a carrier frequency offset value based on the PVT information.

The carrier frequency offset is an embodiment of the Doppler effect in the radio field, and is caused by a relative motion between a transmitter and a receiver. The carrier frequency offset may mean that an offset occurs between a signal carrier frequency received by the receiver and a signal carrier frequency transmitted by the transmitter, and the carrier frequency offset value refers to a frequency offset value when the offset occurs. The carrier frequency offset value refers to a carrier frequency offset value of an RDSS received signal, and specifically refers to a frequency offset value of a carrier frequency of the RDSS received signal relative to a carrier frequency of an RDSS signal sent by the satellite.

For example, as shown in FIG. 6, the apparatus may further include a prediction unit. The prediction unit receives the PVT information transmitted by the RNSS RX, and determines the carrier frequency offset value based on the following implementation. Optionally, the prediction unit may also be integrated into the RNSS baseband processor, or integrated into an RDSS baseband processor in following descriptions. In a possible implementation, the PVT may include the movement velocity and the clock frequency offset estimation value of the apparatus, and the carrier frequency offset value may be determined based on the movement velocity and the clock frequency offset estimation value. Specifically, a Doppler frequency offset value caused by a relative motion between the apparatus and a GEO satellite is determined based on the movement velocity and a motion status of the GEO satellite that provides an RNSS service, and the carrier frequency offset value is determined based on the Doppler frequency offset value and the clock frequency offset estimation value. For a specific process, refer to the related descriptions of Formula (1) and Formula (2) provided above.

S403: Correct a carrier frequency of an RDSS transmitted signal based on the carrier frequency offset value, to obtain the RDSS transmitted signal.

The RDSS transmitted signal may be an RDSS signal sent by the apparatus to a satellite. Because there is a relative motion between the apparatus and the satellite, there is also a deviation between the carrier frequency of the transmitted signal and a carrier frequency of the RDSS signal received by the satellite, so that the apparatus may correct the carrier frequency of the RDSS transmitted signal based on the carrier frequency offset value and corrected carrier frequency of the RDSS transmitted signal is close to a system nominal value. The system nominal value is a reference frequency defined by a system. After receiving the RDSS transmitted signal sent by the apparatus, the satellite may forward the transmitted signal to the central station, and the central station performs pre-detection near the system nominal value, so that the central station can complete capture of the RDSS transmitted signal with minimum resources and signal capture duration is reduced.

Specifically, the apparatus may further include an RDSS transmitter (TX), and the apparatus may generate and send the RDSS transmitted signal by using the RDSS TX. For example, as shown in FIG. 6, the apparatus may include an RDSS TX, and the RDSS TX includes an RDSS TX front-end module, an RDSS TX carrier modulation module, an RDSS shaping and filtering module, an RDSS modulation module, and an RDSS channel encoding module. The RDSS TX front-end module may also be referred to as an RDSS radio frequency channel. The RDSS TX carrier modulation module, the RDSS shaping and filtering module, the RDSS modulation module, and the RDSS channel encoding module are integrated together, and may also be referred to as an RDSS baseband processor. Specifically, the RDSS channel encoding module is configured to perform channel encoding on original bit stream information, to ensure that a preset channel encoding gain is obtained by corresponding decoding at a receive end of an RDSS central station. The RDSS modulation module is configured to perform spreading and modulation processing on encoded symbol data. The RDSS shaping and filtering module is configured to perform shaping and filtering on a spectrum of a modulated signal, and eliminate intersymbol interference, to obtain an RDSS baseband signal. The RDSS TX carrier modulation module is configured to perform carrier modulation on the RDSS baseband signal based on the carrier frequency offset value, to ensure that a carrier frequency of an RDSS intermediate frequency signal obtained after the modulation is close to the system nominal value. The RDSS TX front-end module is configured to perform a series of processing such as DA conversion, up-conversion, and amplification on the RDSS intermediate frequency signal, to obtain an RDSS transmitted signal satisfying a predetermined power strength. Further, the apparatus may send the RDSS transmitted signal by using an antenna.

In this embodiment, after the PVT information is determined based on the RNSS received signal and the carrier frequency offset value is determined based on the PVT information, the carrier frequency of the RDSS transmitted signal is corrected by using the carrier frequency offset value, so that frequency precision of the RDSS transmitted signal can be improved. Therefore, after the apparatus sends the RDSS transmitted signal, when the RDSS central station receives the RDSS transmitted signal, the RDSS central station may perform pre-detection near the system nominal value, so that the central station can complete capture of the RDSS transmitted signal with minimum resources, a communication success rate is improved, and performance of integrating the RNSS and the RDSS and user experience are improved.

The foregoing mainly describes the solutions provided in embodiments of the present disclosure from a perspective of the satellite positioning apparatus. It may be understood that, to implement the foregoing functions, the devices, for example, the satellite positioning apparatus includes a corresponding hardware and/or a software module for performing each function. A person skilled in the art should be easily aware that, with reference to units and algorithm steps of the examples described in embodiments disclosed in this specification, the present disclosure can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In embodiments of the present disclosure, the satellite positioning apparatus may be divided into functional modules based on the foregoing method examples. For example, each functional module may be obtained through division based on each corresponding function, or two or more functions may be integrated into one processing module. The functional module may be implemented in a form of hardware, or may be implemented in a form of a software functional module. It should be noted that, in embodiments of the present disclosure, division into the modules is an example, is merely logical function division, and may be other division in an actual implementation. An example in which each functional module is obtained through division based on each corresponding function is used below for description.

Figure 8:
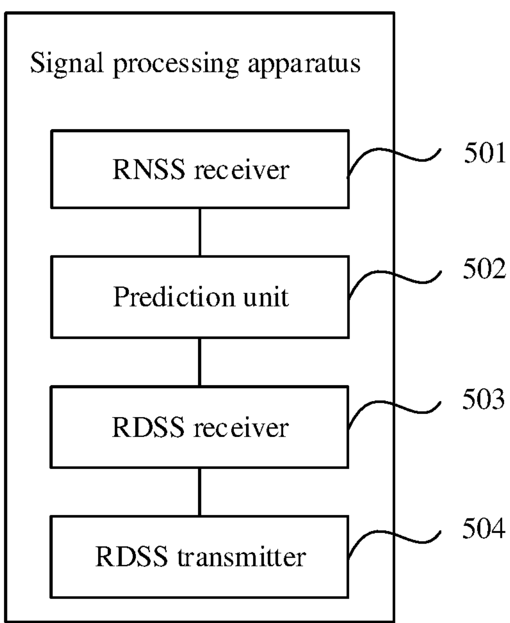
FIG. 8 is a schematic diagram of a structure of still another satellite positioning apparatus according to an embodiment of the present disclosure.

When an integrated unit is used, FIG. 8 is a possible schematic diagram of a structure of a satellite positioning apparatus in the foregoing embodiments. The apparatus may be a subscriber terminal, or a chip built in the subscriber terminal. The apparatus includes: an RNSS receiver 501, a prediction unit 502, and an RDSS receiver 503. Further, the apparatus further includes an RDSS transmitter 504.

In a possible embodiment, the RNSS receiver 501 is configured to support the apparatus in performing S301 in the foregoing method embodiment. The prediction unit 502 is configured to support the apparatus in performing S302 in the foregoing method embodiment. The RDSS receiver 503 is configured to support the apparatus in performing S303 in the foregoing method embodiment. The RDSS transmitter 504 is configured to support the apparatus in performing S304 in the foregoing method embodiment. In another possible embodiment, the RNSS receiver 501 is configured to support the apparatus in performing S401 in the foregoing method embodiment. The prediction unit 502 is configured to support the apparatus in performing S402 in the foregoing method embodiment. The RDSS transmitter 504 is configured to support the apparatus in performing S404 in the foregoing method embodiment.

It should be noted that all related content of the steps in the foregoing method embodiments may be cited in function description of corresponding functional modules.

Based on hardware implementation, the RNSS receiver 501, the prediction unit 502, the RDSS receiver 503, and the RDSS transmitter 504 may be some functions of a processor, the RNSS receiver 501 and the RDSS receiver 503 may be some functions of a receiver, and the RDSS transmitter 504 may be some functions of a transmitter. The receiver and the transmitter may be integrated into a transceiver, and the transceiver may also be referred to as a communication interface.

Figure 9:
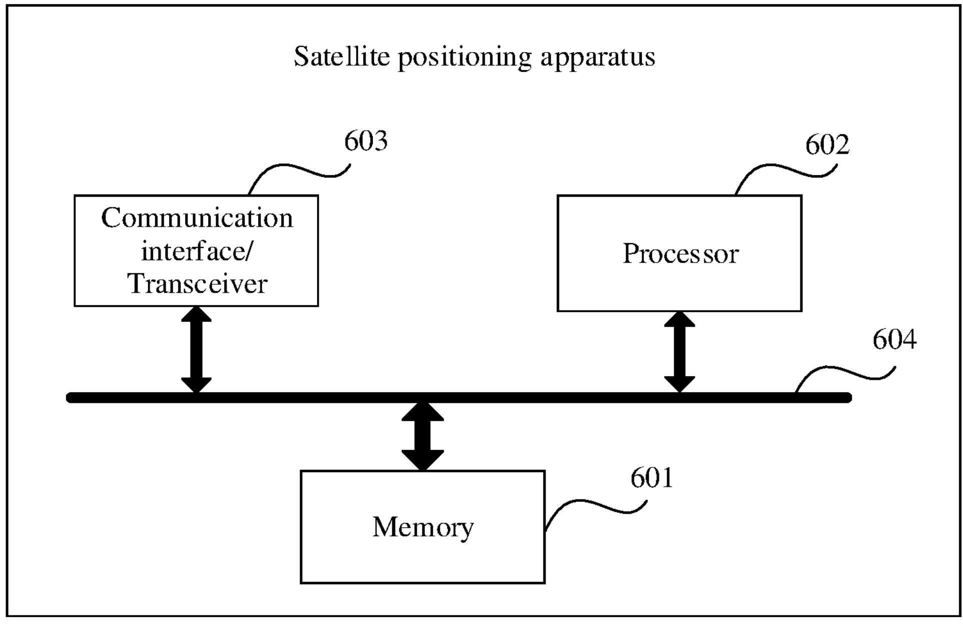
FIG. 9 is a schematic diagram of a structure of another satellite positioning apparatus according to an embodiment of the present disclosure.

FIG. 9 is a diagram of a structure of a possible product form of a satellite positioning apparatus according to an embodiment of the present disclosure.

In a possible product form, the satellite positioning apparatus may be a satellite positioning device, and the satellite positioning device includes a processor 602 and a transceiver 603. The processor 602 is configured to control and manage an action of the satellite positioning device, for example, configured to support the apparatus in performing one or more steps in S301 to S304 in the foregoing method embodiment, or one or more steps in S401 to S403 in the foregoing method embodiment, and/or for other technical processes described herein. The transceiver 603 is configured to support the apparatus in performing the step of receiving an RNSS signal and/or an RDSS signal or the step of sending an RDSS signal in the foregoing method embodiment. Optionally, the satellite positioning device may further include a memory 601.

In another possible product form, the satellite positioning apparatus may be a satellite positioning board, and the satellite positioning board includes a processor 602 and a transceiver 603. The processor 602 is configured to control and manage an action of the apparatus, for example, configured to support the apparatus in performing one or more steps in S301 to S304 in the foregoing method embodiment, or one or more steps in S401 to S403 in the foregoing method embodiment, and/or for other technical processes described herein; and the transceiver 603 is configured to perform, by the apparatus, the step of receiving an RNSS signal and/or an RDSS signal or the step of sending an RDSS signal in the foregoing method embodiment. Optionally, the satellite positioning board may further include a memory 601.

In another possible product form, the satellite positioning apparatus is also implemented by a general-purpose processor, that is, a commonly known chip. The processor includes a processor 602 and a communication interface 603. Optionally, the general-purpose processor may further include a memory 601.

In another possible product form, the satellite positioning apparatus may alternatively be implemented by using the following: one or more field programmable gate arrays (FPGAs), a programmable logic device (PLD), a controller, a state machine, gate logic, a discrete hardware component, any other suitable circuit, or any combination of circuits that can perform various functions described throughout the present disclosure.

The processor 602 may be a central processing unit, a general-purpose processor, a digital signal processor, an application-specific integrated circuit, a field programmable gate array or another programmable logic device, a transistor logic device, a hardware component, or any combination thereof. The processor 602 may implement or execute various example logical blocks, modules, and circuits described with reference to content disclosed in the present disclosure. Alternatively, the processor may be a combination of processors implementing a computing function, for example, a combination of one or more microprocessors, or a combination of the digital signal processor and a microprocessor. In FIG. 9, the processor 602, the communication interface/transceiver 603, and the memory 601 may be connected through a bus 604. The bus 604 may be a peripheral component interconnect (PCI) bus, an extended industry standard architecture (EISA) bus, or the like. The bus 604 may be classified as an address bus, a data bus, a control bus, or the like. For ease of representation, only one bold line is used to represent the bus in FIG. 9, but this does not mean that there is only one bus or only one type of bus.

Figure 10:
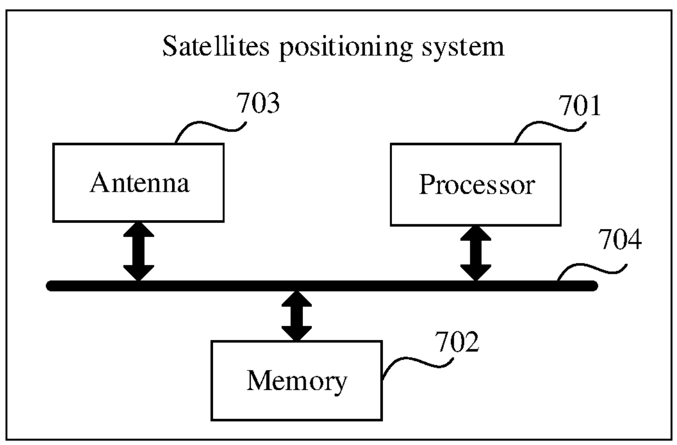
FIG. 10 is a schematic diagram of a structure of a satellite positioning system according to an embodiment of the present disclosure.

An embodiment of the present disclosure further provides a satellite positioning system. As shown in FIG. 10, the system includes a processor 701, a memory 702, and an antenna 703, and the processor 701, the memory 702, and the antenna 703 are connected through a bus 704. The antenna 703 is configured to receive an RNSS signal and/or an RDSS signal, or perform a step of sending an RDSS signal. The memory 702 is configured to store executable instructions. The processor 701 executes the executable instructions, so that the system performs one or more steps in the satellite signal processing method provided in the foregoing method embodiments.

A person of ordinary skill in the art may understand that all or some of the steps of the method embodiments may be implemented by hardware related to program instructions. The program instructions may be stored in a computer-readable storage medium. When the program instructions are run, the steps of the method embodiments are performed. The foregoing storage medium includes any medium that can store program code, such as a USB flash drive, a removable hard disk, a ROM, a RAM, a magnetic disk, or an optical disc.

According to one aspect, an embodiment of the present disclosure further provides a readable storage medium. The readable storage medium stores computer-executable instructions. When the computer-executable instructions are run, a device (which may be a single-chip microcomputer, a chip, a controller, or the like) or a processor is enabled to perform steps in an antenna switching method provided in the present disclosure.

According to one aspect, an embodiment of the present disclosure further provides a computer program product. The computer program product includes computer-executable instructions. The computer-executable instructions are stored in a computer-readable storage medium. At least one processor of a device may read the computer-executable instructions from the computer-readable storage medium. The at least one processor executes the computer-executable instructions, so that the device performs steps in an antenna switching method provided in the present disclosure.

A person of ordinary skill in the art may be aware that units and algorithm steps described with reference to embodiments disclosed in this specification can be implemented by electronic hardware, or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of the present disclosure.

Finally, it should be noted that the foregoing descriptions are merely specific implementations of the present disclosure, but are not intended to limit the protection scope of the present disclosure. Any variation or replacement within the technical scope disclosed in the present disclosure shall fall within the protection scope of the present disclosure. Therefore, the protection scope of the present disclosure shall be subject to the protection scope of the claims.

What is claimed is:

1. A satellite positioning apparatus, comprising:

a radio navigation satellite system (RNSS) radio frequency channel, configured to receive an RNSS received signal;

an RNSS baseband processor, coupled to the RNSS radio frequency channel, and configured to perform position, velocity, and time (PVT) computation on the RNSS received signal, to obtain PVT information;

a radio determination satellite system (RDSS) baseband processor, configured to:

generate a carrier frequency offset value based on the PVT information, wherein the carrier frequency offset value is generated prior to receiving the RDSS received signal, determine a carrier frequency based on the carrier frequency offset value, generate a code phase offset value based on a signal propagation delay derived from the PVT information, wherein the code phase offset value is generated prior to receiving the RDSS received signal, and determine a code phase of the RDSS received signal using the code phase offset value; and an RDSS radio frequency channel, coupled to the RDSS baseband processor, and configured to receive an RDSS received signal using the determined code phase and the determined carrier frequency, wherein the carrier frequency offset value defines a bounded carrier frequency range within which the RDSS received signal is acquired and the code phase offset value defines a bounded code phase range within which the RDSS received signal is acquired.

2. The apparatus according to claim 1, wherein the PVT information comprises: position information, a movement velocity, and/or a clock frequency offset estimation value; and the clock frequency offset estimation value is a difference between a measured clock frequency and a reference clock frequency that are of the apparatus.

3. The apparatus according to claim 2, wherein the PVT information comprises the position information and the clock frequency offset estimation value, and the RNSS baseband processor or the RDSS baseband processor is further configured to:

determine a Doppler frequency offset value based on the movement velocity, and determine the carrier frequency offset value based on the Doppler frequency offset value and the clock frequency offset estimation value.

4. The apparatus according to claim 3, wherein a sum of the Doppler frequency offset value and the clock frequency offset estimation value is the carrier frequency offset value.

5. The apparatus according to claim 2, wherein the PVT information comprises the position information, and the RNSS baseband processor or the RDSS baseband processor is further configured to:

determine a signal propagation delay based on the position information, and determine the code phase offset value based on the signal propagation delay.

6. The apparatus according to claim 5, wherein the code phase offset value is a product of the signal propagation delay and a code frequency.

7. The apparatus according to claim 1, wherein the RDSS baseband processor is further configured to correct a carrier frequency of an RDSS transmitted signal based on the carrier frequency offset value, to obtain the RDSS transmitted signal; and the RDSS radio frequency channel is further configured to send the RDSS transmitted signal.

8. The apparatus according to claim 1, wherein the apparatus is a satellite positioning chip or a satellite positioning device.

9. A satellite positioning apparatus, comprising:

a radio navigation satellite system (RNSS) radio frequency channel, configured to receive an RNSS received signal;

an RNSS baseband processor, coupled to the RNSS radio frequency channel, and configured to perform position, velocity, and time (PVT) computation on the RNSS received signal, to obtain PVT information;

a radio determination satellite system (RDSS) baseband processor, configured to generate a carrier frequency offset value based on the PVT information, wherein the carrier frequency offset value is generated prior to transmitting an RDSS transmitted signal, the carrier frequency offset value comprising a Doppler frequency offset component derived from a movement velocity and a clock frequency offset estimation value, and further configured to correct a carrier frequency of the RDSS transmitted signal using the carrier frequency offset value generated prior to transmitting the RDSS transmitted signal, to obtain the RDSS transmitted signal; and an RDSS radio frequency channel, coupled to the RDSS baseband processor, and configured to send the RDSS transmitted signal, wherein the carrier frequency offset value defines a bounded carrier frequency range within which an RDSS central station acquires the RDSS transmitted signal.

10. The apparatus according to claim 9, wherein the PVT information comprises: the movement velocity and/or the clock frequency offset estimation value; and the clock frequency offset estimation value is a difference between a measured clock frequency and a reference clock frequency that are of the apparatus.

11. The apparatus according to claim 10, wherein the PVT information comprises the movement velocity and the clock frequency offset estimation value, and the RNSS baseband processor or the RDSS baseband processor is further configured to:

determine a Doppler frequency offset value based on the movement velocity, and determine the carrier frequency offset value based on the Doppler frequency offset value and the clock frequency offset estimation value.

12. The apparatus according to claim 11, wherein a sum of the Doppler frequency offset value and the clock frequency offset estimation value is the carrier frequency offset value.

13. The apparatus according to claim 9, wherein the apparatus is a satellite positioning chip or a satellite positioning device.

14. A satellite signal processing method, comprising:

receiving a radio navigation satellite system (RNSS) received signal;

performing position, velocity, and time (PVT) computation on the RNSS received signal, to obtain PVT information;

generating a carrier frequency offset value based on the PVT information, wherein the carrier frequency offset value is generated prior to receiving the RDSS received signal, determining the carrier frequency of a radio determination satellite system (RDSS) received signal based on a carrier frequency offset value, generating a code phase offset value based on a signal propagation delay derived from the PVT information, wherein the code phase offset value is generated prior to receiving the RDSS received signal, and determining a code phase of the RDSS received signal using the code phase offset value; and receiving the RDSS received signal using the determined code phase and the determined carrier frequency of the RDSS received signal, wherein the carrier frequency offset values defines a bounded carrier frequency range within which the RDSS received signal is acquired and the code phase offset value defines a bounded code phase range within which the RDSS received signal is acquired.

15. The method according to claim 14, wherein the PVT information comprises: position information, a movement velocity, and/or a clock frequency offset estimation value; and the clock frequency offset estimation value is a difference between a measured clock frequency and a reference clock frequency that are in the method.

16. The method according to claim 15, wherein the PVT information comprises the movement velocity and the clock frequency offset estimation value, and the method further comprises:

determining a Doppler frequency offset value based on the movement velocity, and determining the carrier frequency offset value based on the Doppler frequency offset value and the clock frequency offset estimation value.

17. The method according to claim 16, wherein a sum of the Doppler frequency offset value and the clock frequency offset estimation value is the carrier frequency offset value of the RDSS.

18. The method according to claim 15, wherein the PVT information comprises the position information and the method further comprises:

determining a signal propagation delay based on the position information, and determining the code phase offset value based on the signal propagation delay.

* * * * *